United States Patent
Nicholson et al.

(10) Patent No.: US 11,506,890 B2
(45) Date of Patent: Nov. 22, 2022

(54) ADJUSTMENT OF LUMINANCE WITHIN AN AUGMENTED REALITY SCENE

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 335 days.

(21) Appl. No.: 16/799,245

(22) Filed: Feb. 24, 2020

(65) Prior Publication Data

US 2021/0263310 A1     Aug. 26, 2021

(51) Int. Cl.
```
G02B 27/00    (2006.01)
G06F 3/01     (2006.01)
G02B 27/01    (2006.01)
G02B 27/09    (2006.01)
```

(52) U.S. Cl.
CPC ..... *G02B 27/0101* (2013.01); *G02B 27/0093* (2013.01); *G02B 27/0972* (2013.01); *G06F 3/017* (2013.01); *G02B 2027/014* (2013.01); *G02B 2027/0118* (2013.01)

(58) Field of Classification Search
CPC .. G02B 27/0101; G02B 27/0093; G06F 3/013
See application file for complete search history.

(56) References Cited

U.S. PATENT DOCUMENTS

| | | | |
|---|---|---|---|
| 2008/0111833 A1* | 5/2008 | Thorn | G06F 1/3231 345/690 |
| 2017/0309079 A1* | 10/2017 | Naples | G06F 3/04815 |
| 2019/0286227 A1* | 9/2019 | Samadani | G06V 40/172 |

* cited by examiner

*Primary Examiner* — Ryan D Howard
(74) *Attorney, Agent, or Firm* — Ference & Associates LLC

(57) ABSTRACT

One embodiment provides a method, including: producing, using one or more optical engines of an augmented reality display, an augmented reality scene; determining, using at least one sensor, a location of a gaze of the user on the augmented reality display; identifying, based upon the location of the gaze, at least one object a user is viewing; and adjusting, based upon identification of the at least one object, luminance within the augmented reality scene. Other aspects are described and claimed.

18 Claims, 3 Drawing Sheets

ADJUSTMENT OF LUMINANCE WITHIN AN AUGMENTED REALITY SCENE

BACKGROUND

Power consumption and overheating has been a reoccurring issue with technology devices. Devices can be designed to perform revolutionary tasks. However, if a system overheats, a system will crash. Over time some strategies have become common to keep a system from overheating. For example, the implementation of device fans, heat pipes, and other cooling solutions now permit the use of a device for extended periods of time, while maintaining a desirable internal temperature that does not cause components within the device to overheat. However, with new technology come new issues to overcome. Augmented reality is a new technology that is now being implemented into a wide variety of systems. However, AR systems require large amounts of power due to the requirement to generate and render displays in real-time. A result of this power use is both heat and an increase in device size for accommodating components to cool the device.

BRIEF SUMMARY

In summary, one aspect provides a method, comprising: producing, using one or more optical engines of an augmented reality display, an augmented reality scene; determining, using at least one sensor, a location of a gaze of the user on the augmented reality display; identifying, based upon the location of the gaze, at least one object a user is viewing; and adjusting, based upon identification of the at least one object, luminance within the augmented reality scene.

Another aspect provides an information handling device, comprising: one or more optical engines of an augmented reality display; at least one sensor; a processor; a memory device that stores instructions executable by the processor to: produce, using the one or more optical engines of an augmented reality display, an augmented reality scene; determine, using the at least one sensor, a location of a gaze of the user within the augmented reality scene; identify, based upon the location of the gaze, at least one object a user is viewing; and adjust, based upon identification of the at least one object, luminance within the augmented reality scene.

A further aspect provides a product, comprising: a storage device that stores code, the code being executable by a processor and comprising: code that produces, using one or more optical engines of an augmented reality display, and augmented reality scene; code that determines, using at least one sensor, a location of a gaze of the user on the augmented reality display; code that identifies, based upon the location of the gaze, at least one object a user is viewing; and code that adjusts, based upon identification of the at least one object, luminance within the augmented reality scene.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
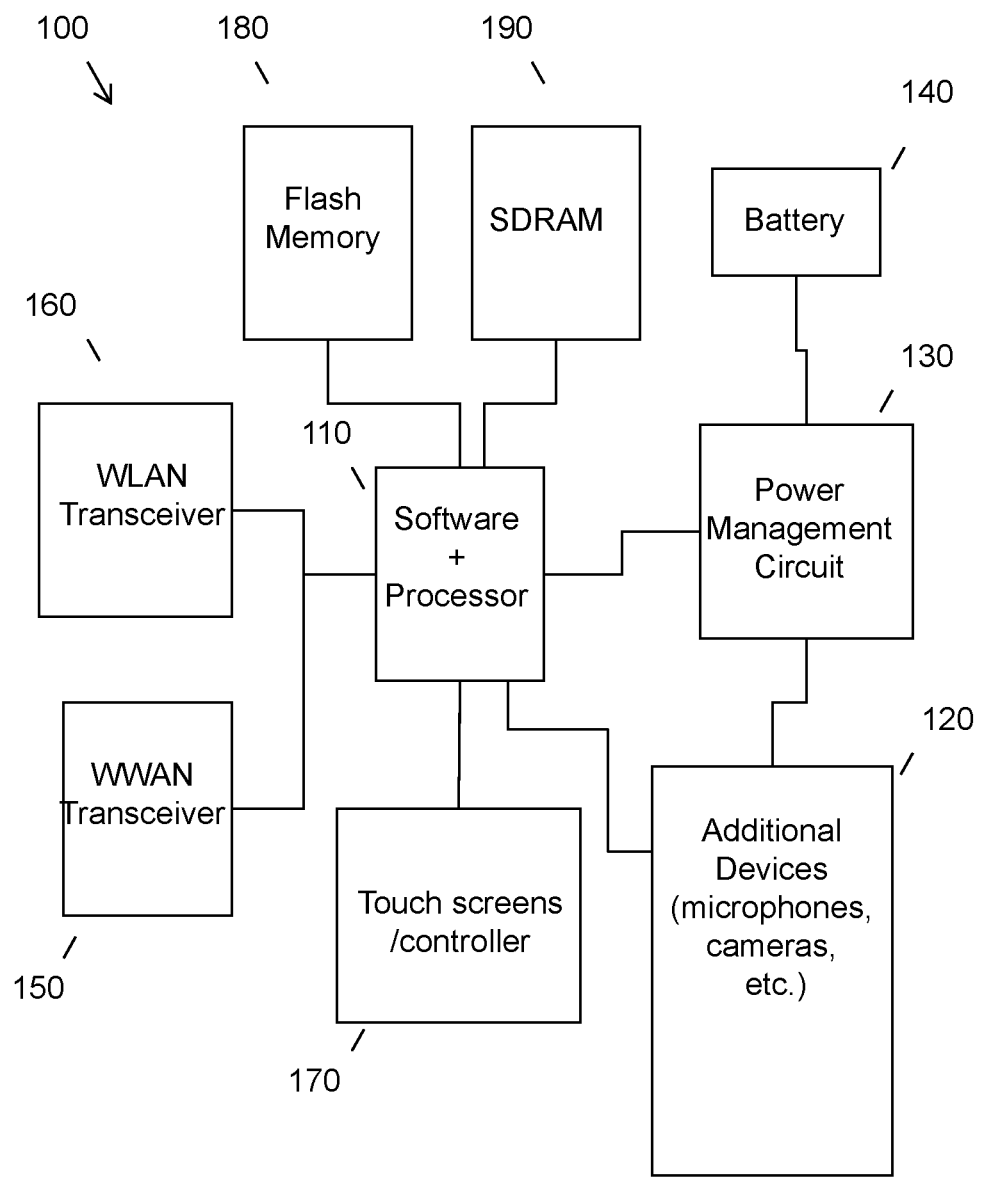
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As augmented reality (AR) techniques are becoming more prevalent in everyday technology, devices that contain AR techniques have been found to overheat due to power consumption of the device. It has been determined that AR uses a large amount of power when producing a scene, even if half of the scene is physical objects. Due to the large amount of power utilized the size of the battery increases in order to extend the time that the device can be worn or utilized without needing to be charged. In other words, since a battery must be powerful enough to run the optical engine and logic chips for an extended period of time, a battery utilized in a system cannot be too small such that it is inefficient in use but also must not be too big to detrimentally influence the size and the weight of the AR device in use. However, the battery accounts for a significant amount of the total size and weight of a device. Additionally, the battery accounts for a portion of the heat produced by the overall system.

The thermal temperature produced by the optical engine and logic chips within an AR device can also cause a device to overheat causing discomfort or potential injury for a user. For example, when using AR glasses, if a system reaches a harmful temperature a user can potentially receive a burn while wearing the glasses. In an attempt to assist with reducing overheating of the AR device, spacing between the components within the device and the spacing between the components and the user may be such that airflow between both the components and the components and the user is increased, thereby allowing for additional cooling the device.

Additionally, devices including AR technology may also be bulbous or uneven because of additional pieces of equipment needed within a device to produce an augmented reality scene. Current AR glasses, or head mounted displays (HMD), must include an optical engine and logic chips, as well as a battery to power such a device. Fitting these necessary AR components onto a pair of glasses, for example, like sunglasses or eyeglasses, results in an uncomfortable, heavy device to be worn on a user's face. Thus, when increasing the spacing between the components and between components and the user to help reduce heat, the AR device increases in size and weight.

Accordingly, the described system and method provides a technique for more efficiently powering a wearable augmented reality device to reduce output heat and device size. Throughout this application reference to AR glasses will be used for ease of readability; however, this is a non-limiting example. The systems and methods described throughout this application may be used for any type of AR or virtual reality (VR) devices or devices that can produce AR or VR. For ease of readability, the discussion will be directed toward AR devices and scenes. However, it should be understood that the described systems and methods can apply to any device that can produce fully virtual or partially virtual scenes, for example, AR devices, VR devices, and the like. For example, the described system may apply to a smartphone or other mobile devices that can run an AR application. Additionally, virtual reality devices may utilize the described luminance techniques, as well. A system may include multiple optical engines to render a virtual reality image on a device. Rendering a virtual object may require significant power, thus generating heat when the optical engines are in use. A system may determine the most appropriate times to turn on an optical engine to view a virtual object. In determining the appropriate time, a system may utilize sensors to track a user's eye position and ultimately trace where a user's gaze is directed. Tracing gaze detection may provide a system with information regarding what object a user is viewing, regardless of whether the object is a physical object or a virtual object. Determination of an object a user is viewing allows a system to adjust the luminance within the AR scene, efficiently providing power to a system when necessary and decreasing power when a user's gaze is not focused on a virtual object.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
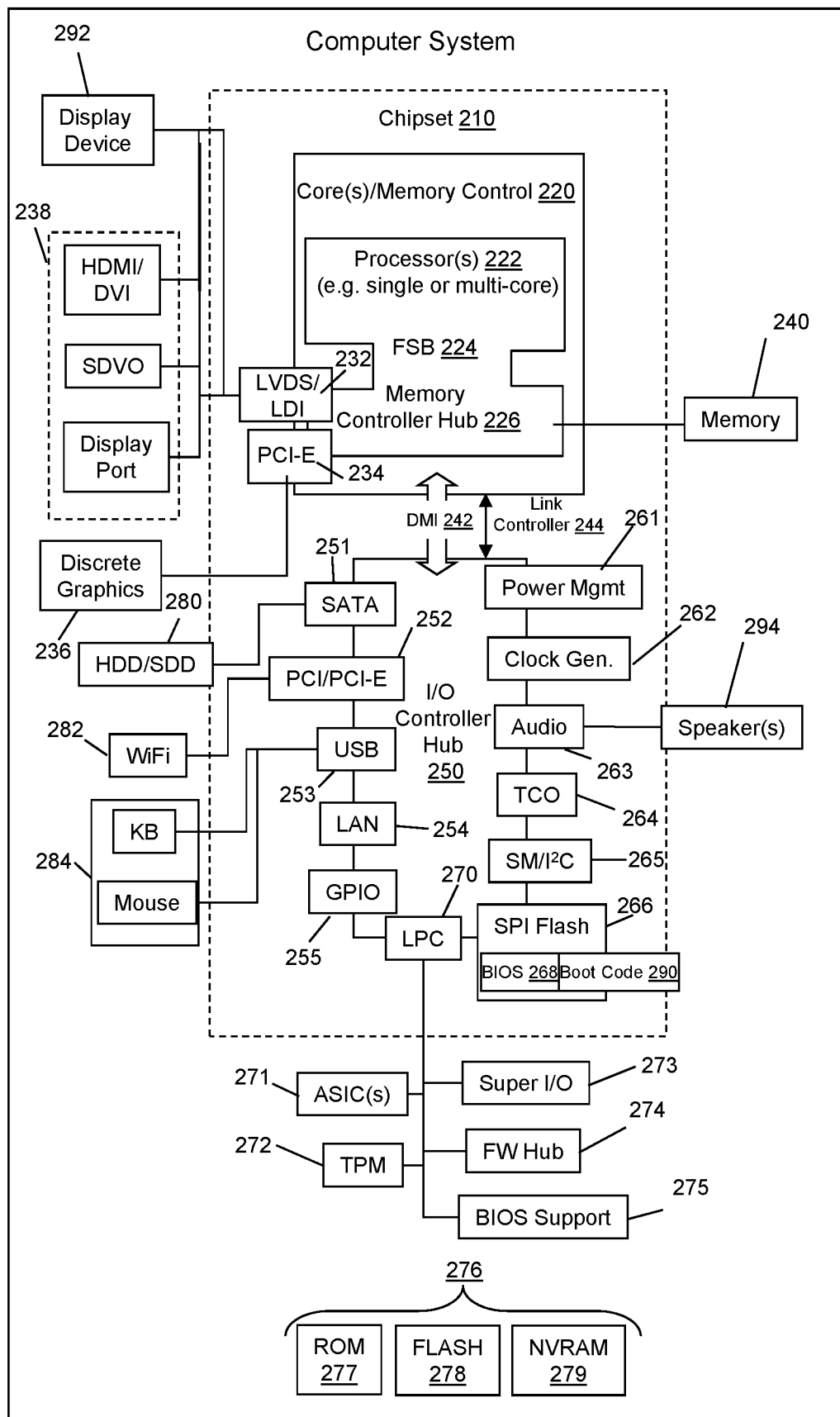
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, micro-phones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of generating, rendering, or displaying augmented reality scenes. For example, the circuitry outlined in FIG. 1 may be implemented in a smart phone or tablet embodiment or a augmented reality glasses embodiment, whereas the circuitry outlined in FIG. 2 may be implemented in a laptop or augmented reality system or headset.

Figure 3:
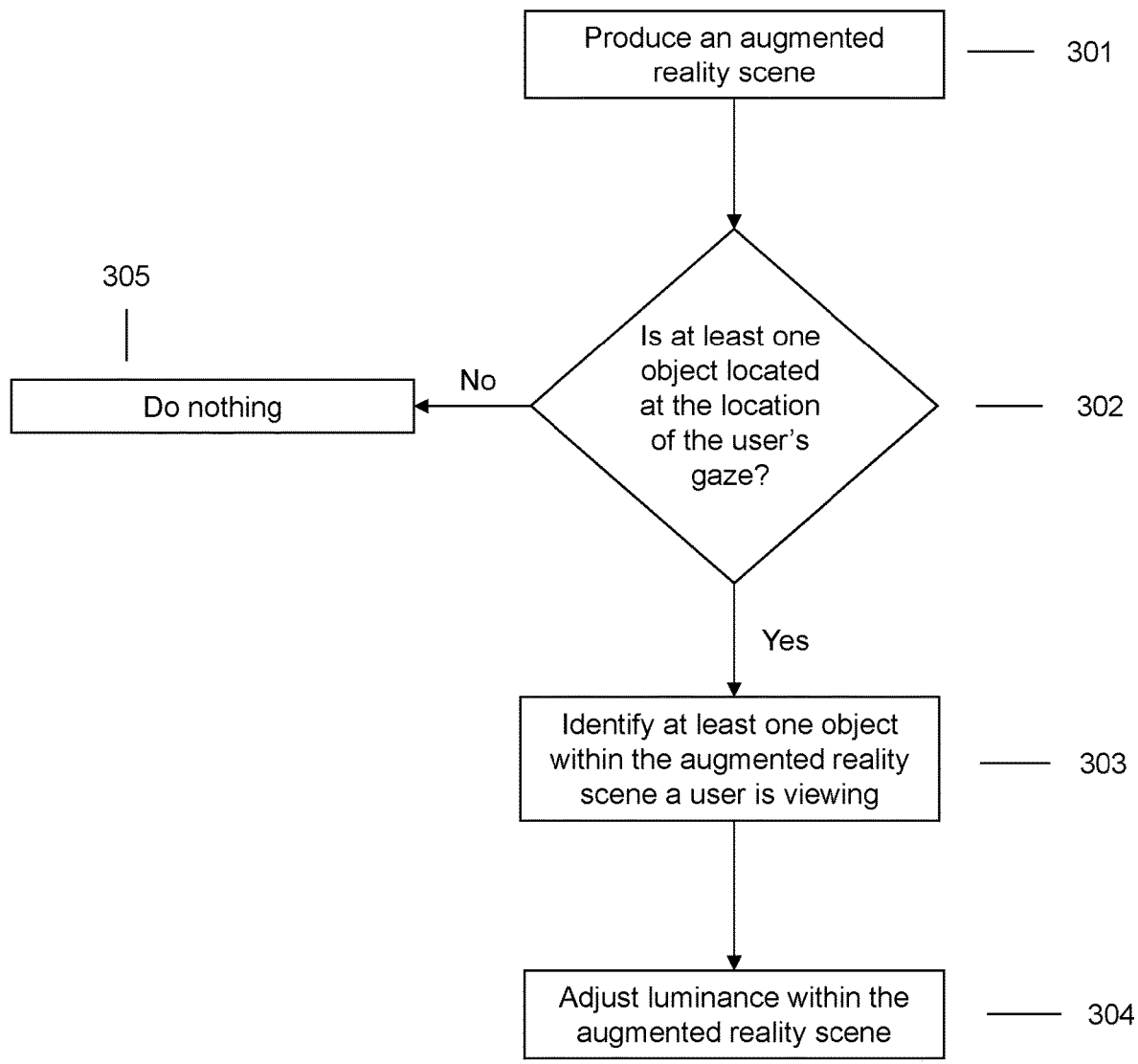
FIG. 3 illustrates an example method of adjusting the luminance of the augmented reality display based on an object being viewed by a user.

Referring now to FIG. 3, a method for rendering an augmented reality scene based upon the gaze of a user in order to reduce power consumption and device heating is provided. In an augmented reality system, the system consumes the most power may be used when generating, rendering, and displaying virtual objects within the augmented reality scene. The display requires power to light, the optical engines require power to process and generate a scene, and sensors require power to determine different characteristics of a user and user's position in order to accurately render the scene. Additionally, maintaining an AR scene requires a consistent amount of power for an extended length of time. Thus, the power source within the system needs to be sufficient for providing the amount of power required by the system. Rather than the augmented reality scene consuming the most amount of power by maintaining the systems maximum luminance across the entirety of the AR scene, the described system and method may change the luminance within an augmented reality scene. By dynamically changing the luminance, a system may conserve power and decrease the heat of system. This has the added benefit of requiring smaller components, for example, batteries, which may then reduce the overall size of the AR device. Additionally, with the smaller components, smaller cooling solutions are possible, thereby decreasing the overall size of the device or system.

At 301, a system may produce an augmented reality scene for an AR device, for example, AR glasses, an AR headset, a portable information handling device that produces AR scenes, or the like. As stated above, the example of AR glasses will be used here throughout to increase readability, but the described system and method is not limited to AR glasses. An augmented reality scene may include virtual content overlaid on physical content. For example, a person may be in a room that is viewable on the AR scene, but objects that appear in the AR scene may be virtual objects, or those rendered by the AR system. An AR scene is generally recognized as a combination of physical or real objects and virtual or rendered objects combined into a single scene.

One or more optical engines may be used to produce an AR scene, and in doing so an optical engine may act as a light source and provide luminance to the display within the AR system. The optical engines used in a system may be any optical engine configuration that is utilized in AR/VR systems. For example, one conventional method is utilizing a projector coupled with a waveguide as optical engines within a system. Another example is utilizing a micro-display with a compensating prism as optical engines within a system. Other optical engine configurations are possible and contemplated. An example of a projector coupled with a wave guide may be a liquid crystal display (LCD), and an example of a micro-display with a compensating prism may be a light-emitting diode (LED). Both optical engine versions may work with the methods described herein. Generally, an AR device includes two optical engines, one for each eye of a user. However, the described system and method can be utilized with a single optical engine or more than two optical engines.

Each of the optical engines may produce zones or segments of luminance. In other words, rather than producing a single global backlight, each optical engine may produce multiple backlights that are provided within the zones or segments of the augmented reality scene. Utilizing the multiple zones, the system can control which zones are illuminated, thereby controlling the virtual objects that are illuminated. Accordingly, each zone of the optical engines may be controlled independently from other zones produced by the optical engines.

After rendering an augmented reality scene on the AR display, a system may determine whether an object within the AR scene is located at the location of the user's gaze at 302. To make this determination the system may a system may determine the location of a user's gaze within the augmented reality scene. In determining the location of a user's gaze a system may track the eye position of the user. Tracking the eye position of the user may be done with the use of sensors operatively coupled to the AR glasses system, for example, cameras, eye tracking sensors, or the like. Sensors may continually track a user's eye position while a system is in use, which may provide a system with information in determining a location of a user's gaze. In an embodiment, at least one sensor detecting a user's gaze and eye position may be integrally coupled to an augmented reality device. It should be understood that the sensors do not have to be a direct component of the AR system, but may also be sensors accessible by the AR system. For example, the AR system may access cameras within a room where the AR system is being utilized. Alternatively or additionally, the sensors may be located on the AR system, for example, within or on the AR glasses or headset.

Once the location of the user's gaze is determined, the system can determine whether an object, whether physical or virtual, of the AR scene is at the location of the user's gaze. If there is no object at the location of the user's gaze, the system may do nothing at 305. Doing nothing may also refer to decreasing the luminance of all virtual objects or aspects of the augmented reality scene. By doing nothing, the luminance of the AR device may be powered down to conserve a maximum amount of power; however, a system may not turn off completely to allow for continuous gaze tracking. If, however, there is an object at the location of the user's gaze the system may attempt to identify the object a user is viewing within the scene, as seen at 303. The object that a user is viewing in the augmented reality scene may be one of a virtual object or a physical object.

To identify the object, or even determine if the user is looking at an object, the system may identify the location, for example, coordinates, of the user's gaze on the display. The system may then correlate this location with the augmented reality scene rendering. Since the system knows what is being rendered and where objects on the display are being rendered, the system can correlate the location of the user's gaze on the display with the rendering map of the augmented reality scene. Once this correlation is made the system can identify what object is currently being rendered at that display location, thus identifying the object the user is viewing. Identifying the object of the user's gaze allows for identifying whether the user is viewing a virtual or physical object. Based upon identification of the object, the system can dynamically modify the luminance of the system.

For example, a system may determine that a user is viewing a virtual object in the augmented reality scene. A system may track the user's eye position and further determine a user's gaze, and from the location of the user's gaze a system may conclude that the user is viewing a virtual object in the augmented reality scene. Similarly, a system may determine that a user is viewing a physical object in the augmented reality scene. A system may track the user's eye position and further determine a user's gaze, and from the location of the user's gaze a system may conclude that the user is viewing a physical object in the augmented reality scene.

Based on upon the object being viewed by a user, a system may adjust the luminance of the augmented reality display accordingly at 304. In an embodiment when a system determines that a user is viewing a virtual object in a system, the luminance of the virtual object on the display may increase. Increasing the luminance of the virtual object of the display may provide a clearer virtual image to the user. Alternatively, the system may not change the luminance of the object the user is currently viewing. For example, if the object is currently being rendered and displayed at the default luminance, the system may not change the luminance of the object at all.

In an embodiment, for all additional virtual objects, aside from the virtual object being viewed, the system may decrease the luminance. The system may also decrease the luminance of objects that are further from the user's gaze. In other words, the system may keep an area in proximity to the user's gaze at normal luminance, and decrease the luminance of objects further from the user's gaze, thereby minimizing the effect or viewability of the change of luminance on the user. By decreasing the luminance of other virtual objects within the augmented reality scene, a system may provide a clear view of the virtual object in view while simultaneously decreasing the amount of power used, and thus the amount of heat being produced by a system. How much the luminance of objects is changed by may be a default setting or may be set by the user.

In an embodiment when a system determines that a user is viewing a physical object in system, the luminance of all the surrounding virtual objects may be decreased. When a user is viewing a physical object, luminance of pixels to produce virtual objects may be unnecessary. Additionally, illuminating the pixels of at least one virtual object while viewing a physical object in an augmented reality display may be disruptive to a user. Alternatively or additionally, the system may decrease the luminance of objects further from the user's gaze, as described above with respect to the viewing of a virtual object. By decreasing the luminance associated with the augmented reality scene while viewing a physical object, a system may conserve energy because of the lack of optical engine use at an instance.

Since it is a scene being rendered, a user's gaze may change and move between the objects being viewed in an augmented reality scene. As a user's gaze moves between objects, a system may readjust the luminance of pixels based on the object being viewed. Thus, the system can adjust and change the luminance of rendered objects dynamically and in real-time as the user's gaze direction and focus changes. This readjusting of illuminated pixels may keep the total power used and the heat produced by the system at lower values in comparison to continually running the entirety of an augmented reality scene for an extended period of time, as in conventional systems. Thus, rather than a system reaching an overheating and potentially dangerous state, a system may remain cool for a longer period of time, promoting a longer consistent use of an augmented reality device display.

The various embodiments described herein thus represent a technical improvement to conventional methods for decreasing power used and producing less heat in an augmented reality device. Rather than continuously running an augmented reality device at 100 percent while in use, a system may detect the object a user is viewing by tracking the user's gaze, and based on the object being viewed adjust the luminance affiliated with the object in view. Readjusting the luminance based on the object being viewed may keep a system running for an extended period of time and may avoid a system from overheating. Additionally, smaller components can be utilized, thereby reducing the overall size of the AR system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
producing, using one or more optical engines of an augmented reality display, an augmented reality scene;
determining, using at least one sensor, a location of a gaze of the user on the augmented reality display;
identifying, based upon the location of the gaze, at least one object a user is viewing, wherein the at least one object is a physical object; and
adjusting, based upon identification of the at least one object, luminance within the augmented reality scene, wherein the adjusting the luminance comprises decreasing the luminance of pixels in the augmented reality scene associated with a virtual aspect of the augmented reality scene.

2. The method of claim 1, wherein the identifying comprises correlating the location of the gaze with a location within the augmented reality scene and identifying an object at the location within the augmented reality scene.

3. The method of claim 1, wherein the at least one object comprises a virtual object; and
wherein adjusting the luminance comprises increasing luminance of pixels in the augmented reality scene associated with the virtual object.

4. The method of claim 1, wherein adjusting the luminance comprises decreasing luminance of virtual objects not being viewed by the user.

5. The method of claim 1, wherein the determining comprises utilizing eye tracking to determine a position of focus of eyes of the user.

6. The method of claim 1, comprising readjusting the luminance within the augmented reality scene responsive to detecting a change in the location of the gaze.

7. The method of claim 1, wherein the one or more optical engines produce zones of luminance and wherein each zone of luminance is controlled independently of other zones of luminance.

8. The method of claim 1, wherein the one or more optical engines comprise an optical engine selected from the group consisting of: a projector coupled with a wave guide and a micro-display with a compensating prism.

9. The method of claim 1, wherein the at least one sensor comprises a camera integrally coupled to the augmented reality display.

10. An information handling device, comprising:
one or more optical engines of an augmented reality display;
at least one sensor;
a processor;
a memory device that stores instructions executable by the processor to:
produce, using the one or more optical engines of an augmented reality display, an augmented reality scene;
determine, using the at least one sensor, a location of a gaze of the user within the augmented reality scene;
identify, based upon the location of the gaze, at least one object a user is viewing, wherein the at least one object is a physical object; and
adjust, based upon identification of the at least one object, luminance within the augmented reality scene, wherein to adjust the luminance comprises decreasing the luminance of pixels in the augmented reality scene associated with a virtual aspect of the augmented reality scene.

11. The information handling device of claim 10, where to identify comprises correlating the location of the gaze with a location within the augmented reality scene and identifying an object at the location within the augmented reality scene.

12. The information handling device of claim 10, wherein the at least one object comprises a virtual object; and
wherein to adjust the luminance comprises increasing luminance of pixels in the augmented reality scene associated with the virtual object.

13. The information handling device of claim 10, wherein to adjust the luminance of virtual objects not being viewed by the user.

14. The information handling device of claim 10, wherein to determine comprises utilizing eye tracking to determine a position of focus of eyes of the user.

15. The information handling device of claim 10, comprising instructions to readjust the luminance within the augmented reality scene responsive to detecting a change in the location of the gaze.

16. The information handling device of claim 10, wherein the one or more optical engines produce zones of luminance and wherein each zone of luminance is controlled independently of other zones of luminance.

17. The information handling device of claim 10, wherein the one or more optical engines comprise an optical engine selected from the group consisting of: a projector coupled with a wave guide and micro-display with a compensating prism.

18. A product, comprising:
a storage device that stores code, the code being executable by a processor and comprising:
code that produces, using one or more optical engines of an augmented reality display, and augmented reality scene;
code that determines, using at least one sensor, a location of a gaze of the user on the augmented reality display;
code that identifies, based upon the location of the gaze, at least one object a user is viewing, wherein the at least one object is a physical object; and
code that adjusts, based upon identification of the at least one object, luminance within the augmented reality scene, wherein the code that adjusts the luminance comprises decreasing the luminance of pixels in the augmented reality scene associated with a virtual aspect of the augmented reality scene.

\* \* \* \* \*